United States Patent
Du et al.

(10) Patent No.: US 12,045,702 B2
(45) Date of Patent: Jul. 23, 2024

(54) DEEP UNSUPERVISED LEARNING APPROACH, DEVICE AND STORAGE MEDIUM FOR AIRSPACE COMPLEXITY EVALUATION

(71) Applicant: Beihang University, Beijing (CN)

(72) Inventors: Wenbo Du, Beijing (CN); Xianbin Cao, Beijing (CN); Biyue Li, Beijing (CN); Xi Zhu, Beijing (CN); Yumeng Li, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 912 days.

(21) Appl. No.: 17/102,984

(22) Filed: Nov. 24, 2020

(65) Prior Publication Data

US 2021/0174262 A1   Jun. 10, 2021

(30) Foreign Application Priority Data

Dec. 10, 2019   (CN) .......................... 201911258728.3

(51) Int. Cl.
*G06N 3/045*   (2023.01)
*G06N 3/088*   (2023.01)
(Continued)

(52) U.S. Cl.
CPC ............. *G06N 20/10* (2019.01); *G06N 3/045* (2023.01); *G06N 3/088* (2013.01); *G08G 5/0043* (2013.01);
(Continued)

(58) Field of Classification Search
CPC ............................... G06N 3/045; G06N 3/088
See application file for complete search history.

(56) References Cited

U.S. PATENT DOCUMENTS 10,620,631 B1 * 4/2020 Abeloe .................... G06N 7/01
10,992,764 B1 * 4/2021 Esmaeili ............... H04L 67/535
(Continued)

FOREIGN PATENT DOCUMENTS

| CN | 103530704 B | * 10/2013 |
| CN | 109495920 A |   3/2019  |
| CN | 109993225 A |   7/2019  |

OTHER PUBLICATIONS

D. Gianazza and K. Guittet, "Selection and Evaluation of Air Traffic Complexity Metrics," 2006 ieee/aiaa 25th Digital Avionics Systems Conference, Portland, OR, USA, 2006, pp. 1-12, doi: 10.1109/DASC.2006.313710. keywords: {Telecommunication traffic; Principal component analysis; Neural networks}, (Year: 2006).*

(Continued)

*Primary Examiner* — Barbara M Level (74) *Attorney, Agent, or Firm* — Calfee, Halter & Griswold LLP (57) ABSTRACT

This application provides an airspace complexity evaluation method based on deep unsupervised learning for air traffic management, which includes the following parts. A stacked autoencoder is used to establish an airspace complexity evaluation model. Input the airspace complexity factors into the stacked autoencoder to obtain the low-dimensional embedded representations of the airspace complexity factors. Cluster the low-dimensional embedded points to capture the centroids of the airspace complexity data. The application utilizes the soft assignment distribution and real assignment distribution of the embedded representations to construct a training loss function which optimizes the airspace complexity evaluation model by gradient descent algorithm. The trained airspace complexity evaluation model and the three obtained cluster centroids describing the (Continued)

airspace complexity level are used to evaluate the current airspace complexity.

7 Claims, 5 Drawing Sheets

(51) Int. Cl.
*G06N 20/10* (2019.01)
*G08G 5/00* (2006.01)
(52) U.S. Cl.
CPC ......... *G08G 5/0095* (2013.01); *G08G 5/0082* (2013.01)

(56) References Cited

U.S. PATENT DOCUMENTS

| | | | | |
|---|---|---|---|---|
| 2012/0330867 | A1* | 12/2012 | Gemulla | G06F 17/10 706/12 |
| 2018/0165554 | A1* | 6/2018 | Zhang | G06N 7/01 |
| 2019/0124045 | A1* | 4/2019 | Zong | G06N 7/01 |
| 2020/0168108 | A1* | 5/2020 | Letsu-Dake | G08G 5/0013 |
| 2021/0089055 | A1* | 3/2021 | Tran | B64U 10/30 |
| 2021/0358313 | A1* | 11/2021 | Ayhan | G08G 5/0043 |
| 2022/0254259 | A1* | 8/2022 | Martinez | G08G 5/0043 |
| 2024/0014827 | A1* | 1/2024 | Muñoz Hernández | H03M 7/70 |

OTHER PUBLICATIONS

H. Ismkhan and M. Izadi, "Proposing a Dimensionality Reduction Technique With an Inequality for Unsupervised Learning from High-Dimensional Big Data," in IEEE Transactions on Systems, Man, and Cybernetics: Systems, vol. 53, No. 6, pp. 3880-3889, Jun. 2023, doi: 10.1109/TSMC.2023.3234227. (Year: 2023).*

David Gianazza. Airspace configuration using air traffic complexity metrics. ATM 2007, 7th USA/Europe Air Traffic Management Research and Development Seminar, Jul. 2007, Barcelona, Spain. pp xxxx. ffhal-00938172 (Year: 2007).*

Zeng, W.; Xu, Z.; Cai, Z.; Chu, X.; Lu, X. Aircraft Trajectory Clustering in Terminal Airspace Based on Deep Autoencoder and Gaussian Mixture Model. Aerospace 2021, 8, 266. https://doi.org/10.3390/aerospace8090266 (Year: 2021).*

A. Dairi, F. Harrou, Y. Sun and M. Senouci, "Obstacle Detection for Intelligent Transportation Systems Using Deep Stacked Autoencoder and k-Nearest Neighbor Scheme," in IEEE Sensors Journal, vol. 18, No. 12, pp. 5122-5132, Jun. 15, 15, 2018, doi: 10.1109/JSEN.2018.2831082. (Year: 2018).*

Bo Li, Peixin Gao, Shiyang Liang, and Daqing Chen. Jul. 2019. Intelligent Flight Control of Combat Aircraft Based on Autoencoder. In Proceedings of the 2019 4th International Conference on Robotics, Control and Automation (ICRCA 2019). Association for Computing Machinery, New York, NY, USA, 65-68. (Year: 2019).*

Unsupervised Learning Wikipedia, archived Nov. 14, 2019, retrieved https://web.archive.org/web/20191114213256/https://en.wikipedia.org/wiki/Unssupervised_learning, 4 pages. (Year: 2019).*

Modeling language and cognition with deep unsupervised learning: a tutorial overview Marco Zorzi 1,2*, Alberto Testolin1 and Ivilin P. Stoianov1,3 1 Computational Cognitive Neuroscience Lab, Department of General Psychology, University of Padova, Padova, Italy (Year: 2013).*

First Office Action from China National Intellectual Property Administration in Chinese Application No. 201911258728.3, dated Aug. 24, 2020 (8 pages).

Journal of Electronics & Information Technology, vol. 40 No. 6, Jun. 2018, pp. 1316-1322 Name of the author: Xu Sen, Hua Xiaopeng, Xu Jing, Xu Xiufang, Gao Jun, An Jing Title: Cluster Ensemble Approach Based on T-distributed Stochastic Neighbor Embedding.

* cited by examiner

DEEP UNSUPERVISED LEARNING APPROACH, DEVICE AND STORAGE MEDIUM FOR AIRSPACE COMPLEXITY EVALUATION

CROSS-REFERENCE TO RELATED APPLICATIONS

This application claims priority to Chinese Patent Application No. 201911258728.3, filed on Dec. 10, 2019, which is hereby incorporated by reference in its entirety.

TECHNICAL FIELD

The application involves the technical field of the airspace situation assessment of air traffic management. In particular it relates to an airspace complexity evaluation method device and storage medium based on deep unsupervised learning to assist controllers in air traffic control.

BACKGROUND ART

With the rapid advancement of civil aviation transport worldwide, the number of flights continues to grow. This massive air traffic flow has brought high control pressure to the air traffic controller (ATC), who is in charge of the sector, the basic control unit of airspace. The control pressure causes fatigue among ATCs and likely results in airspace operation risks. Airspace complexity calculation refers to the complexity of the airspace commanded by the air traffic controllers, including visible aircraft operations, invisible program operations, and so on. Airspace complexity evaluation is one of the widely studied issues in the field of air traffic management, attracting many investigations from scholars and field practitioners. The main research content of this question is: how to use the airspace situation operation characteristics to evaluate the complexity level of the airspace which includes the high complexity, the medium complexity, and the low complexity. The obtained complexity results will guide the air traffic controllers to perform sector control strategies.

Airspace complexity calculation can be expressed as a classification problem. The traditional method is based on the experience and knowledge of the air traffic controllers to evaluate the airspace complexity, which generally includes the following three steps. (1) Vectorize the operational characteristics of the airspace situation obtained from the original data. (2) Calculate the complexity factors through the vectorized calculation of the airspace situation operation characteristics. (3) Calibrate the airspace complexity according to the air traffic controllers' experience and knowledge with reference to the calculated complexity factors. It can be seen that the above method depends on the experience and knowledge of air traffic controllers, which requires a lot of manpower and material resources. In addition, traditional methods cannot achieve real-time evaluation of airspace complexity. That is, given a piece of airspace operational data, air traffic controllers still need a certain amount of time to perform manual calculations to obtain the airspace complexity level.

With the rise of machine learning, supervised learning methods are widely used in pattern recognition and classification tasks, achieving impressive results. When using traditional supervised learning methods to evaluate the airspace complexity, it is necessary to provide a large amount of labeled data, otherwise, the model is prone to under-fitting. On the contrary, if the number of labeled samples are not enough, the model may be over-fitting, when using advanced supervised learning methods based on deep learning. Therefore, the use of supervised learning methods for airspace complexity calculations relies on high-quality and massive labeled samples for model learning. However, obtaining massive labeled samples is a time-consuming and labor-intensive process in which is also difficult to ensure the quality of the data. The supervised learning approach for airspace complexity calculation encounters a huge challenge.

Unsupervised learning algorithms have great advantages in mining the data information, analyzing the data structure and mining the potential features of the original data, which are widely used in scientific fields such as data mining and data processing. In terms of airspace complexity evaluation, Gianazza (Document 1: D. Gianazza, Airspace configuration using air traffic complexity metrics. In Proc. ATM, Barcelona, Spain, 2007) used the principal component analysis (PCA) in unsupervised learning to select 6 key complexity factors that can fully represent the sector operation complexity. After dimension reduction with PCA, the airspace complexity was classified through a Back Propagation Neural Network (BPNN). The method proposed by Gianazza solved the problems of high dimensions of complexity sample and redundancy of complexity factors. However, this strategy is not optimal. PCA is a linear dimension reduction method that does not consider the nonlinear relationship between airspace complexity factors, making it difficult to accurately classify airspace complexity data. The traditional unsupervised learning methods still face the following challenges when solving airspace complexity evaluation tasks:

(1) Airspace complexity is affected by a combination of subjective, objective, dynamic and static factors, such as air routes and sector entering and exiting points, etc. The high dimension of airspace complexity data will lead to dimensional disasters. When it is used to classify tasks, the sample is prone to bias. (2) The complex non-linear relationship between original data space is difficult to predict. Although non-linear unsupervised algorithms such as spectral clustering and the Gaussian kernel method can solve non-linear problems in some data space, these studies are still not well applied to the airspace complexity evaluation problem.

SUMMARY

In the airspace complexity evaluation of traffic control, problems such as inaccurate evaluation results caused by the inability to classify the data accurately, or difficulty in evaluation due to the need for massive high-quality manual calibration samples, etc. lead to wrong conclusions and misjudgments for controllers. This application provides a deep unsupervised learning approach, device and storage medium for airspace complexity evaluation which can further reduce the cost of labeling. This deep unsupervised learning approach for airspace complexity evaluation does not require labeled dataset by controllers and makes the results more accurate through the powerful nonlinear mapping capability of the deep learning to mine the low-dimensional embedded information of data samples.

In an aspect, the application implements the evaluation method of airspace complexity based on a deep unsupervised learning algorithm and processes the airspace complexity factors extracted from the airspace operation situation data. This method comprising:

step 1, establish an airspace complexity evaluation model based on the deep learning network structure of a stacked autoencoder and obtain the initial centroids of the clusters, specifically, the original airspace complexity data are input into the autoencoder for pre-training and the low-dimensional embedded representations of the airspace complexity factors are obtained; three complexity levels of the airspace operational situation are corresponding to three clusters; K-means clustering is used to obtain the initial centroids of the training sample set represented by low-dimensional embedded process;

step 2, construct a loss function used to train the deep unsupervised model for airspace complexity evaluation, specifically, it is assumed that the low-dimensional embedded points have a real assignment distribution for clustering tasks; use the t-distribution to construct a soft assignment, which measures the similarity between low-dimensional embedded points and cluster centroids, the training goal of the airspace complexity evaluation model is to make the soft assignment distribution closer to the real assignment distribution; the relative entropy KL-divergence in information theory is used to measure the difference between the soft assignment distribution and the real assignment distribution and construct the loss function;

step 3, optimize the loss function in step 2 by the gradient descent algorithm using the training sample set, the gradient descent method is used to minimize the loss function of step 2 to train the airspace complexity evaluation model, the cluster centroids of the three airspace complexity levels are updated during the training process;

after step 3, a trained airspace complexity evaluation model and three cluster centroids of airspace complexity are obtained;

step 4, use the trained airspace complexity evaluation model to evaluate the airspace complexity in real time.

The air traffic controller extracts the airspace complexity factors from the current airspace operational situation data, and inputs them into the trained airspace complexity evaluation model then obtain a low-dimensional embedded point. Calculate the soft assignment distribution between the low-dimensional embedded point and the centroids of the three airspace complexity clusters. The airspace complexity corresponding to the centroid with the largest soft assignment distribution is the complexity level of the current input airspace complexity factors.

The stacked autoencoder in step 1 comprising an encoder network and a decoder network, which are mirror symmetry. The encoder network performs low-dimensional embedded representation on the input airspace complexity factors and realizes non-linear dimension reduction. The decoder network reconstructs the data according to the low-dimensional embedded representation. The nonlinear mapping function is obtained by training the stacked autoencoder model with the training sample set. The objective function of training is $\|y-x\|^2$, where x represents the training sample set and it is a collection of history airspace complexity factors, and y represents the reconstructed data of the decoder network.

In another aspect, this application also provides an airspace complexity evaluation device based on deep unsupervised learning device, comprises:

a first processor, configured to obtain an airspace complexity evaluation model based on the deep learning network structure of a stacked autoencoder and the initial centroids of three clusters, where the three clusters are corresponding to three complexity levels of the airspace operational situation;

a second processor, configured to obtain a loss function used to train the airspace complexity evaluation model;

a third processor, configured to minimize the loss function to train the airspace complexity evaluation model by the gradient descent algorithm using training sample set;

a fourth processor, configured to evaluate the airspace complexity in real time using the trained airspace complexity evaluation model.

This application further provides a storage medium encoded with a set of machine-executable instructions to perform a method for airspace complexity evaluation, the method comprises:

establish an airspace complexity evaluation model based on the deep learning network structure of a stacked autoencoder and the initial centroids of three clusters, where three clusters are corresponding to three complexity levels of the airspace operational situation;

construct a loss function used to train the airspace complexity evaluation model;

optimize the loss function to train the airspace complexity evaluation model by the gradient descent algorithm using training sample set;

evaluate the airspace complexity in real time using the trained airspace complexity evaluation model.

Compared with the prior techniques, the present application has the following advantages and positive effects:

(1) Compared with the existing supervised learning methods, the airspace complexity evaluation method based on deep unsupervised learning designed in this application can classify the complexity of the airspace sector data, without using any expert labels labeled by air traffic controllers for training. The application reduces the manpower and material cost of the airspace complexity evaluation work and avoids the problems of inaccurate learning of the supervised model caused by the misjudgment of the air traffic controllers.

(2) Compared with traditional unsupervised learning methods, the deep unsupervised model proposed in this application fully takes into account the inherent characteristics of airspace complexity data: the sample is prone to bias, and the complicated non-linear relationships between the original data space. The application benefits from the non-linear mapping capability of the autoencoder network, realizing the effective dimension reduction of the airspace complexity factors and further realizing the accurate evaluation of the airspace complexity data.

BRIEF DESCRIPTION OF DRAWINGS

The figures are only for the purpose of showing specific embodiments, not considered to limit the present disclosure. Throughout the figures, the same reference symbols indicate the same components.

DESCRIPTION OF THE EMBODIMENTS

To facilitate those skilled in the art to understand and implement the present application, the following describes the embodiments of the present disclosure in detail with reference to the accompanying figures. The figures form a part of the present application and are used to explain the principles of the present application together with the embodiments of the present application, not to limit the scope of the present application.

With the rise of deep learning, unsupervised learning based on deep neural networks has received widespread attention. Through deep neural networks, theoretically, the complex nonlinear mapping can be realized. Therefore, the non-linear characteristics of the data space can be learned based on the data samples, which solves the blindness of traditional unsupervised learning methods. As a mature framework in deep learning, the Autoencoder based algorithms use deep neural network (DNN) architectures to extract inherent features in complex data, achieving effective nonlinear dimension reduction. The autoencoder model of deep unsupervised learning can give the low-dimensional embedded representations of the original data in a black-box model. Although this representation lacks interpretability, through a lot of scientific research and experimental verification, this low-dimensional embedded representation often accurately describes the characteristics of the original data samples and improves the classification effect when used for classification problems. This application performs airspace complexity calculation on the acquired original airspace operational data by using unsupervised learning. The unsupervised learning method in this application combined with the deep neural network greatly improves the accuracy of data classification. The training process of the unsupervised learning model does not rely on the data labeled by air traffic controllers, which saves a lot of manpower and material resources. In addition, the generative model in deep unsupervised learning can generate new samples with the same distribution as the original data, which can be used to expand the sample set, thus improving the training effect of the model and the accuracy of spatial complexity determination.

Figure 1:
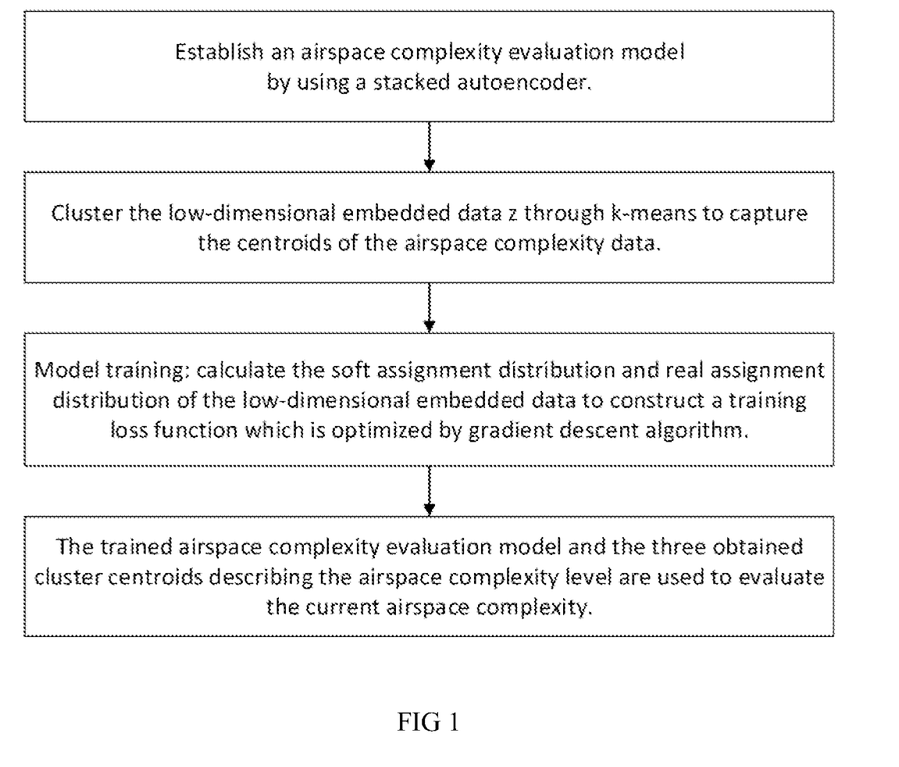
FIG. 1 is a schematic diagram of the overall flow of the deep unsupervised learning approach for airspace complexity evaluation in this application.

The airspace complexity evaluation method based on deep unsupervised learning of this application is illustrated in the following four steps as shown in FIG. 1. The data involved in the airspace complexity calculation includes 28 factors, which are calculated and extracted by the air traffic controllers through the airspace operational situation data. Specifically, these factors describe the dynamic and static factors that affect the airspace operational complexity, including the number of ascending/descending aircraft, the variance of ground speed, the average density, the sector capacity, the aircraft horizontal/vertical proximity, the mean distance of air route intersections, the distance variance of air route intersections, the minimum safety height of the maximum air route, etc. For details, please refer to Document 2 (Xi Zhu, Xianbin Cao, Kaiquan Cai. Measuring air traffic complexity based on small samples[J]. Journal of China Aeronautics and Astronautics, English Edition, 2017 (30): 1505). The following steps of the application directly operate on the extracted airspace complexity factors set.

Figure 3:
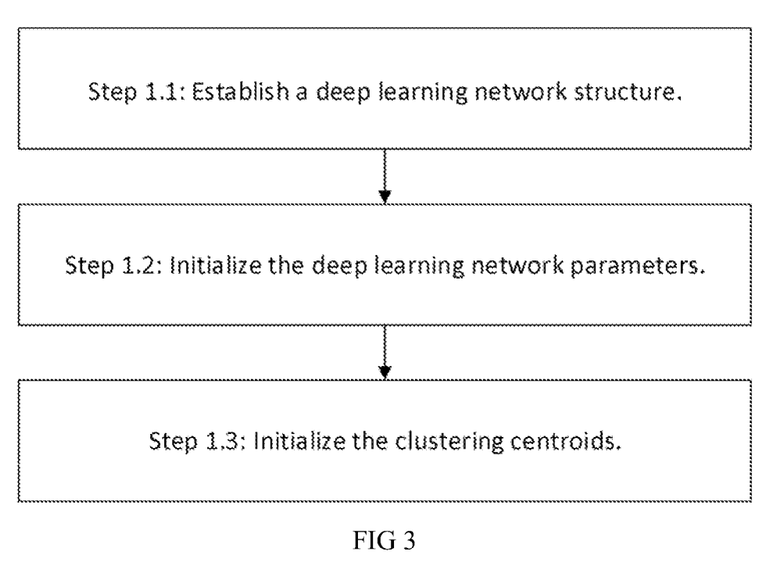
FIG. 3 is a specific flowchart for model initialization in step 1 in this application.

Step 1: Establish an airspace complexity evaluation model based on deep learning network and initialize model parameters.

The input of the deep learning network is the airspace complexity factors. In the embodiment of this application, each training sample contains the 28-dimensional airspace complexity factors. Each training sample is denoted as $x=\{x_i=(x_{i1}, x_{i2}, \ldots, x_{i28})\}_{i=1}^{N}$, and N represents the number of the training samples.

In order to directly mine the low-dimensional embedded representations of airspace complexity data and eliminate the dimension disaster problem during the training of deep learning model, the dimension reduction need to be performed on the set of the airspace complexity factors before the clustering tasks. The deep learning network of this application adopts a stacked autoencoder model to perform low-dimensional embedded representation on training samples. The low-dimensional embedded representation of sample $x_i$ is $z_i=f_\theta(x_i)$. $z_i$ is the low-dimensional embedded point of $x_i$. The nonlinear mapping of the deep learning network is denoted by $f_\theta: x \rightarrow z=\{z_i\}_{i=1}^{N}$, where $\theta$ are variable parameters and z is the low-dimensional embedded representations based on the deep learning network. In the proposed method of this application, the encoder network of the deep autoencoder is used to realize $f_\theta$, which will be described in step 1.2. Step 1 is divided into the following steps 1.1 to 1.3 to explain.

Figure 2:
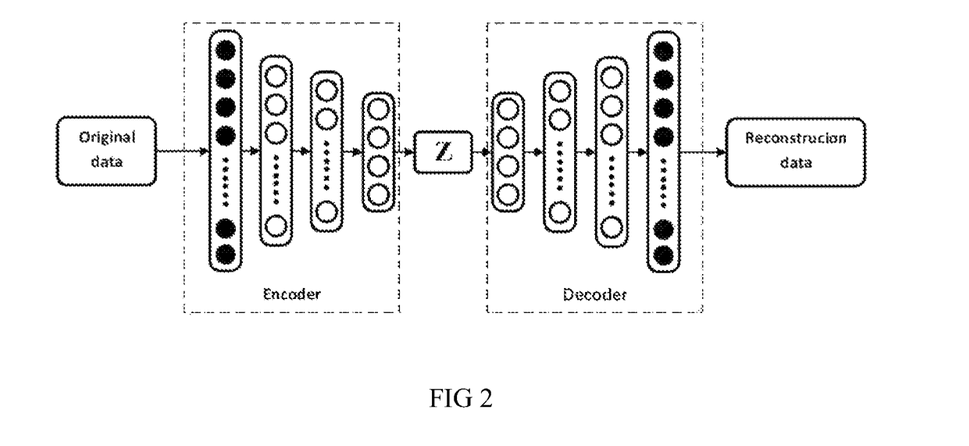
FIG. 2 is a schematic diagram of the stacked autoencoder used in this application.

Step 1.1: Establish a deep learning network structure.

First, a stacked autoencoder model is established to mine the low-dimensional embedded information of the original airspace complexity factors set. The stacked autoencoder includes an encoder network and a decoder network, which are mirror symmetry structures, as shown in FIG. 2. The encoder network performs low-dimensional embedded representation on the original data and realizes non-linear dimension reduction. The calculation of the encoder network is as follows.

$$\tilde{x} = \text{Dropout}(x) \quad (1)$$

$$z = g_1(W_1 \tilde{x} + b_1) \quad (2)$$

The above formula indicates that the input sample set x is processed by Dropout(•) and the output set is $\tilde{x}$. Dropout(•) is a method to enhance the robustness of deep learning networks. Dropout(•) will randomly set some characteristic factors of some samples in $x=\{x_i=(x_{i1}, x_{i2}, \ldots, x_{i28})\}_{i=1}^{N}$ to 0. $W_1$, $b_1$ represent the weights and the bias of the encoder network based on the deep learning network, respectively. $g_1(\cdot)$ is the activation function of the encoder network based on the deep learning network, and the ReLu function is used in the embodiment of this application.

The decoder network of the stacked autoencoder reconstructs the data according to the low-dimensional embedded representation so as to ensure that the dimension reduction process is reasonable and not arbitrarily assigned. The calculation of the decoder network is as follows.

$$\tilde{z} = \text{Dropout}(z) \quad (3)$$

$$y = g_2(W_2 \tilde{z} + b_2) \quad (4)$$

The above formula indicates that the reconstruction set is 2 after performing Dropout(•) on the data set z. Dropout(•) will randomly set some characteristic factors of some samples in $z=\{z_i\}_{i=1}^{N}$ to 0. y represents the data set reconstructed from the decoder network of the stacked autoencoder. $W_2$, $b_2$ represent the weights and the bias of the decoder network based on the deep learning network, respectively. $g_2(\cdot)$ is the activation function of the decoder network based on the deep learning network, and the ReLu function is used in the embodiment of this application.

The present application uses a stacked autoencoder to give the low-dimensional embedded representations of the original data in a black-box model. Although this representation lacks interpretability, through a lot of scientific research and experimental verification, this low-dimensional embedded representation often accurately describes the characteristics of the original data samples and improves the classification effect when used for classification problems.

Step 1.2: Initialize the deep learning network parameters.

Deep learning network are extremely sensitive to data variance and initial values. In order to improve the training effect of the deep learning network, the parameters need to be initialized reasonably.

The objective function of deep learning network is $\|y-x\|^2$, where x represents the input data of encoder network and y represents the reconstructed data of the decoder network. Taking $\theta=(W_1,b_1,W_2,b_2)$ as the deep learning network parameters, the original training data x are used for optimizing the deep learning network by gradient descent algorithm.

$$\theta = \arg\min\|y-x\|^2 \quad (5)$$

When the network pre-training is completed, the decoder network of the stacked autoencoder is taken away, and the encoder network is retained. Finally, the low-dimensional embedded representation of the original data is obtained $f_\theta(\cdot): z_i=f_\theta(x_i), z=\{z_i\}_{i=1}^N$, z is the low-dimensional embedded representation.

Step 1.3: Initialize the clustering centroids.

Each cluster represents a level of airspace complexity of the airspace operation situation. The airspace complexity in the embodiment of this application will include 3 clusters, which represent the high complexity, medium complexity, and low complexity, respectively.

Using the encoder network of the stacked autoencoder trained in step 1.2, as a low-dimensional embedded mapping method, the original 28-dimensional airspace complexity factors are represented by low-dimensional embedded representations. The trained stacked autoencoder model perform low-dimensional embedded representation $z=\{z_i\}_{i=1}^N$ on training sample set $x=\{x_i=(x_{i1}, x_{i2}, \ldots, x_{i28})\}_{i=1}^N$. This step performs k-means clustering on the low-dimensional embedded representations $z=\{z_i\}_{i=1}^N$. The number of the specified clusters is k, and k=3 in this application. The process of clustering is as follows.

a. Randomly initialize the centroids of k clusters $\{\mu_j\}_{j=1}^k$.

b. Calculate the Euclidean distance between each sample in $z=\{z_i\}_{i=1}^N$ and k centroids $\{\mu_j\}_{j=1}^k$. The distance between $z_i$ and $\mu_j$ is $d_{ij}=\|z_i-\mu_j\|^2$.

c. Set the threshold of distance to $d_0$, and the number of training iterations is $N_0$.

d. If $d_{ij} \leq d_0$, cluster the i-th sample $z_i$ into the j-th cluster until all N samples in $z=\{z_i\}_{i=1}^N$ have been assigned.

e. The set of all samples in the j-th cluster is denoted as $\{z_j^m\}$, and m represents that there are m samples in the j-th cluster.

f. Calculate the arithmetic mean $$\delta_j = \frac{\sum_{i=1}^m z_j^i}{m}$$

of all samples $\{z_j^m\}$ in the j-th cluster until each cluster has been calculated.

g. For each cluster, update the value of centroid $\mu_j$ to $\delta_j$ where j=1, 2, ..., k.

h. Repeat the above steps b g until the end of $N_0$ iterations. Finally get the centroids $\{\mu_j\}_{j=1}^k$ of k clusters.

After performing k-means clustering on the low-dimensional embedded representation, k cluster centroids $\{\mu_j\}_{j=1}^k$ are obtained which are the initialization cluster centroids. In the present application, traditional k-means clustering is adopted, which has the advantages of simple parameter adjustment and rapid convergence.

Figure 4:
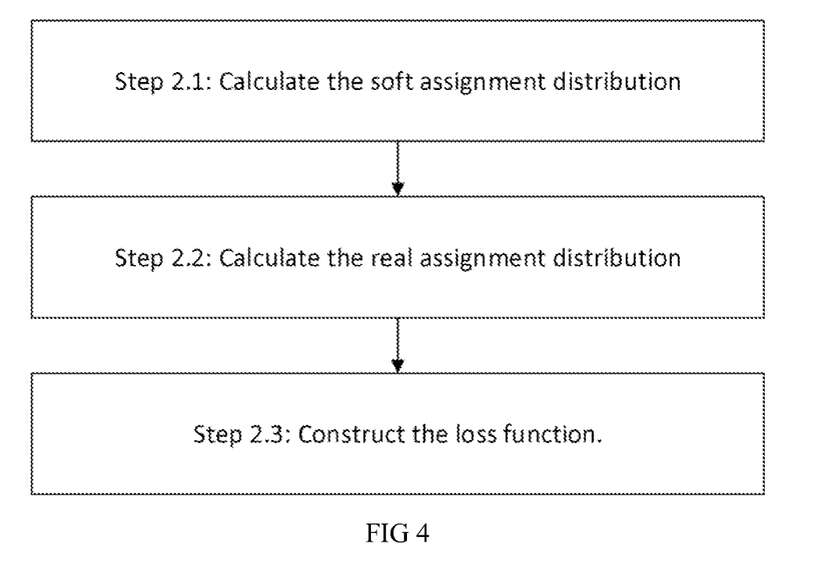
FIG. 4 is a specific flowchart of construct the loss function in step 2 in this application.

Step 2: Construct a loss function and train the deep learning network model.

Step 2 is divided into the following steps 2.1 to 2.3 to explain.

Step 2.1: Calculate the soft assignment distribution of each low-dimensional embedded point $z_i$ and the centroid of each cluster.

The application utilizes the t-distribution as a kernel to measure the similarity between the low-dimensional embedded point $z_i$ and the centroid point $\mu_j$. The soft assignment distribution $q_{ij}$ is defined as follows:

$$q_{ij} = \frac{\left(1 + \frac{\|z_i - \mu_j\|^2}{\alpha}\right)^{-\frac{\alpha+1}{2}}}{\sum_j \left(1 + \frac{\|z_i - \mu_j\|^2}{\alpha}\right)^{-\frac{\alpha+1}{2}}} \quad (6)$$

Among them, $q_{ij} \in [0,1]$, represents the probability of assigning the i-th low-dimensional embedded point $z_i$ to the j-th cluster $\mu_j$, j=1, 2, ..., k. The larger the probability value, the more likely the low-dimensional embedded point is to be classified into the corresponding cluster. $\alpha$ is an adjustable constant, set $\alpha=1$ here.

Step 2.2: Calculate the real assignment distribution of each low-dimensional embedded point $z_i$.

Suppose there is a real assignment distribution $p_{ij}$ for the actual clustering task in the data $z_i$. The method compute $p_{ij}$ by first raising $q_{ij}$ to the second power and then normalizing by frequency per cluster.

$$p_{ij} = \frac{q_{ij}^2 / f_j}{\sum_j q_{ij}^2 / f_j} \quad (7)$$

Among them, $p_{ij}$ represents the real assignment distribution of the low-dimensional embedded point $z_i$ to the j-th cluster. $f_j = \Sigma_i q_{ij}$ represents the sum of the total soft assignment distribution probability of the low-dimensional embedded points classified into the j-th cluster.

Step 2.3: Construct the loss function.

The training goal of the deep learning network is to learn the real assignment distribution $p_{ij}$ that actually exists for clustering tasks. Although the real assignment distribution $p_{ij}$ exists objectively, it cannot be known in advance in the present application. The soft assignment distribution $q_{ij}$ based on the t-distribution can be calculated in real time according to original 28-dimensional feature factors $x=\{x_i=(x_{i1}, x_{i2}, X_{i3}, \ldots, x_{i28})\}_{i=1}^N$, $f_\theta(\cdot)$ obtained in the manner mentioned in step 1.2 and $\{\mu_j\}_{j=1}^k$ obtained in the manner mentioned in step 1.3.

The goal of the deep learning network is to make the soft assignment distribution $q_{ij}$ closer to the real assignment distribution $p_{ij}$ as much as possible. The loss function in this application uses KL divergence in information theory to measure the similarity of two distributions.

$$L = KL(P \| Q) = \sum_i \sum_j p_{ij} \log \frac{p_{ij}}{q_{ij}} \quad (8)$$

Among them, $L \geq 0$, if and only if the P and Q distributions are exactly the same, L=0. P represents the real assignment distribution and Q represents the soft assignment distribution.

The objective of the gradient descent algorithm to optimize the loss function is as follows:

$$\min L = KL(P \| Q) = \sum_i \sum_j p_{ij} \log \frac{p_{ij}}{q_{ij}} \quad (9)$$

$$\theta = \operatorname{argmin} L = KL(P \| Q) = \sum_i \sum_j p_{ij} \log \frac{p_{ij}}{q_{ij}} \quad (10)$$

The goal of neural network training is to minimize the loss function L. Complete the optimization of L through the stochastic gradient strategy in step 3 and continuously update the parameters of the deep learning network $\theta = (W_1, b_1, W_2, b_2)$.

Step 3: During training, a momentum-based Stochastic Gradient Descent (SGD) is used to jointly optimize the cluster centroid $\{\mu_j\}$ and deep leaning network's parameters $\theta$.

The gradients of L with low-dimensional embedded point $z_i$ and each cluster centroid $\mu_j$ are computed as follows:

$$\frac{dL}{dz_i} = \frac{\alpha+1}{\alpha} \sum_j \left(1 + \frac{\|z_i - \mu_j\|^2}{\alpha}\right)^{-1} \times (p_{ij} - q_{ij})(z_i - \mu_j) \quad (11)$$

$$\frac{dL}{d\mu_j} = -\frac{\alpha+1}{\alpha} \sum_i \left(1 + \frac{\|z_i - \mu_j\|^2}{\alpha}\right)^{-1} \times (p_{ij} - q_{ij})(z_i - \mu_j) \quad (12)$$

The gradients $$\frac{dL}{dz_i} \text{ and } \frac{dL}{d\mu_j}$$

are then passed down to the encoder network of the stacked autoencoder network and used to compute the network's parameter $\theta$. The training is completed when the total number of loop iterations set in advance is reached. The total number of loop iterations in the embodiment of this application is a constant that needs to be adjusted during experiments, and is not a uniquely determined value.

During the training process, as the network parameters of the encoder network of the stacked autoencoder change, the cluster centroids corresponding to the three complexity levels of the airspace operational situation are also updated. The method of updating the centroids adopt the method in step 1.3, which is to perform traditional k-means clustering on the data set $z = \{z_j\}_{i=1}^N$.

Step 4: Through steps 2-3, the trained deep network model and the cluster centroids of three airspace complexity levels are obtained. Use the trained model to evaluate the complexity of the collected data in real time. The process of determining the airspace complexity is to perform cluster assignment.

The trained airspace complexity evaluation model has the ability to mine the non-linear characteristics of the original data. In addition, the model can perform high-quality clustering based on low-dimensional embedded representations. The currently collected airspace operational data are expressed as a 28-dimensional feature factors $x_i = (x_{i1}, x_{i2}, x_{i3}, \ldots, x_{i28})$ after preprocessing. Input $x_i$ into the airspace complexity evaluation model, and output low-dimensional embedded points with good clustering characteristics $z_i = (z_{i1}, z_{i2}, z_{i3}, \ldots, z_{ir})$, where r is the dimension of the low-dimensional embedded space, $r < 28$. Input $z_i$ and the cluster centroid into formula (6) to calculate the soft assignment distribution $q_{ij}$, where $j = 1, 2, 3$. The data $z_i$ will be assigned to the j-th cluster with the largest $q_{ij}$: assignment $(i,j) = \operatorname{argmax} q_{ij}$ In this way, the data $x_i$ belongs to the airspace complexity level corresponding to the j-th cluster. Repeat the above process until all data points are assigned, that is, the airspace complexity evaluation task is completed.

In addition to providing the airspace complexity evaluation method based on deep unsupervised learning, this embodiment also provides an airspace complexity evaluation device. Because the airspace complexity evaluation device adopts the same inventive concept as the aforementioned method, only the structure of this airspace complexity evaluation device will be described below. For the technical effects and technical problems solved by its specific application, please refer to the previous statement.

Figure 5:
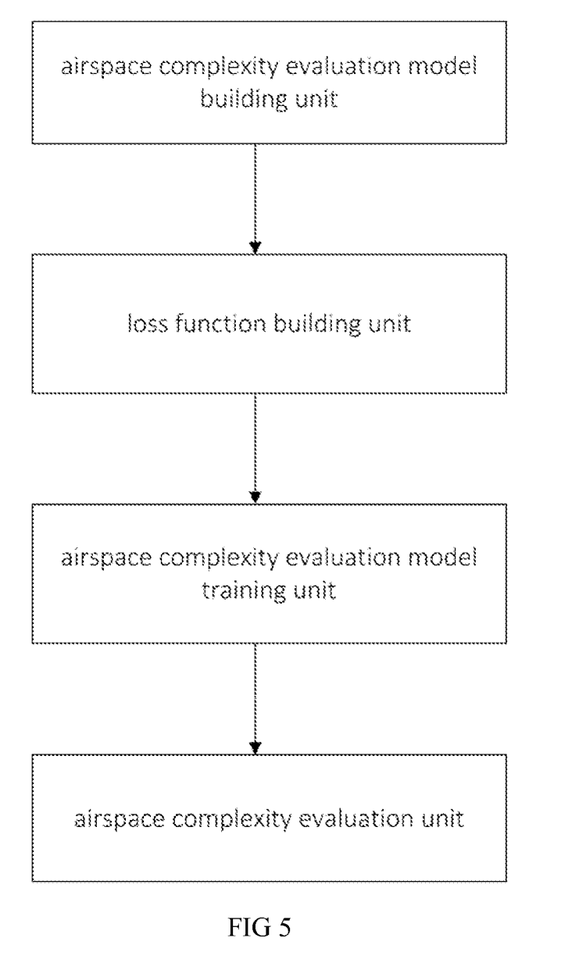
FIG. 5 is a schematic structural diagram of an airspace complexity evaluation device provided in this application.

FIG. 5 is a schematic structural diagram of an airspace complexity evaluation device provided by an embodiment. As shown in FIG. 5, this device comprises airspace complexity evaluation model building unit, loss function building unit, airspace complexity evaluation model training unit, and airspace complexity evaluation unit. Wherein the airspace complexity evaluation model building is implemented by a first processor, the loss function building is implemented by a second processor, the airspace complexity evaluation model training is implemented by a third processor, the airspace complexity evaluation is implemented by a fourth processor.

Each of the first processor, the second processor, the third processor and the fourth processor is independent processor, or all of them are integrated in a single processor.

airspace complexity evaluation model building unit is configured to obtain an airspace complexity evaluation model based on the deep learning network structure of a stacked autoencoder and the initial centroids of three clusters, where the three clusters are corresponding to three complexity levels of the airspace operational situation;

loss function building unit is configured to obtain a loss function used to train the airspace complexity evaluation model;

airspace complexity evaluation model training unit is configured to minimize the loss function to train the airspace complexity evaluation model by the gradient descent algorithm using training sample set;

airspace complexity evaluation unit is configured to evaluate the airspace complexity in real time using the trained airspace complexity evaluation model.

In addition, an embodiment of this present disclosure also provides a storage medium encoded with a set of machine-executable instructions to perform a method for airspace complexity evaluation, the method comprises:

establish an airspace complexity evaluation model based on the deep learning network structure of a stacked autoencoder and the initial centroids of three clusters, where three clusters are corresponding to three complexity levels of the airspace operational situation;

construct a loss function used to train the airspace complexity evaluation model;

optimize the loss function to train the airspace complexity evaluation model by the gradient descent algorithm using training sample set;

evaluate the airspace complexity in real time using the trained airspace complexity evaluation model.

Those skilled in the art may understand that all or part of the process of implementing the method in the above embodiments may be completed by a computer program instructing relevant hardware, and the program may be stored in a readable computer storage medium. Wherein, the readable computer storage medium can be a magnetic disk, a light disk, a read-only storage memory or a random storage memory, etc.

The above is only a preferred embodiment of the application, but the scope of protection of the application is not limited to this. Any change or replacement that can be easily thought of by any person familiar with the technical field within the technical scope of the application shall be covered in the scope of protection of the application.

The foregoing descriptions of specific exemplary embodiments of the present application have been presented for purposes of illustration and description. They are not intended to be exhaustive or to limit the application to the precise forms disclosed, and obviously many modifications and variations are possible in light of the above teachings. The exemplary embodiments were chosen and described in order to explain certain principles of the invention and their practical application, to thereby enable those skilled in the art to make and utilize various exemplary embodiments of the present invention, as well as various alternatives and modifications thereof. It is intended that the scope of the invention be defined by the Claims appended hereto and their equivalents.

What is claimed is:

1. A method for evaluating airspace complexity based on deep unsupervised learning is used to process airspace complexity factors extracted from airspace operational situation data, comprising:

step 1: establish an airspace complexity evaluation model based on the deep learning network and obtain the initial centroids of the clusters;

a stacked autoencoder model is adopted for the deep learning network; the stacked autoencoder comprises an encoder network and a decoder network, which are mirror symmetry; the original airspace complexity factors sample is input into the encoder network of the stacked autoencoder and the low-dimensional embedded representations of the airspace complexity factors are obtained;

the encoder network performs non-linear dimension reduction on the original data; the decoder network reconstructs the data according to the low-dimensional embedded representation; a nonlinear mapping function is obtained by training the stacked autoencoder model; the objective function of training is $\|y-x\|^2$, where x represents the input data of encoder network and it is a collection of history airspace complexity factors and z represents the corresponding low-dimensional embedding points set; y represents the reconstructed data of the decoder network; $\theta$ represents the network parameters of the stacked autoencoder;

three complexity levels of the airspace operational situation are corresponding to three clusters; K-means clustering is used to obtain the initial centroids of the training sample set represented by low-dimensional embedded data;

step 2: construct a loss function used to train the deep unsupervised model for airspace complexity evaluation; assume that the low-dimensional embedded points have a real assignment distribution for clustering tasks; use the t-distribution to construct a soft assignment, which measures the similarity between low-dimensional embedded points and cluster centroids; the training goal of the airspace complexity evaluation model is to make the soft assignment distribution closer to the real assignment distribution; the relative entropy KL-divergence in information theory is used to measure the difference between the soft assignment distribution and the real assignment distribution and construct the loss function;

step 3: optimize the loss function in step 2 by the gradient descent algorithm using the training sample set x; the gradient descent method is used to minimize the loss function of step 2 to train the airspace complexity evaluation model; the three cluster centroids of airspace complexity levels are updated during the training process;

after step 3, a trained airspace complexity evaluation model and three cluster centroids of airspace complexity are obtained;

step 4: use the trained airspace complexity evaluation model to evaluate the airspace complexity in real time;

the air traffic controller extracts the airspace complexity factors from the current airspace operational situation data; and inputs them into the trained airspace complexity evaluation model to obtain a low-dimensional embedded point; calculate the soft assignment distribution between the low-dimensional embedded point and the centroids of the three airspace complexity clusters;

the airspace complexity corresponding to the centroid with the largest soft assignment distribution is the complexity level of the current input airspace complexity factors.

2. The method according to claim 1, wherein:

in step 1, each training sample is denoted as $x=\{x_i=(x_{i1}, x_{i2}, \ldots, x_{i28})\}_{i=1}^{N}$, and N represents the number of the training samples; each training sample $x_i$ contains the 28-dimensional airspace complexity factors; the low-dimensional embedded representation of sample $x_i$ is $z_i=f_\theta(x)$; $z_i$ is the low-dimensional embedded point of $x_i$; the nonlinear mapping function is denoted by $f_\theta:x\rightarrow z=\{z_i\}_{i=1}^{N}$, where $\theta$ is the parameters of the deep learning network and z is the low-dimensional embedded representations of the training sample; the low-dimensional embedded z is input to the decoder network of the stacked autoencoder model, and the reconstruction data set y are output;

the objective function of training the stacked autoencoder model is $\|y-x\|^2$, where x represents the input data of encoder network and y represents the reconstructed data of the decoder network; the original training data x are used for training the stacked autoencoder network by gradient descent algorithm and get the parameters $\theta$; when the pre-training is completed, the decoder network of the stacked autoencoder is taken away, and the encoder network is retained; finally, a low-dimensional latent representation of the original data is obtained by $f_\theta(\cdot)$ which is a non-linear mapping function.

3. The method according to claim 2, wherein, the step 2 comprises:

step 2.1: calculate the soft assignment distribution of each low-dimensional embedded point $z_i$ and the centroid $\mu_j$ of each cluster;

the application utilizes the t-distribution as a kernel to measure the similarity between the low-dimensional embedded point $z_i$ and the centroid point $\mu_j$; the soft assignment distribution $q_{ij}$ is defined as follows:

$$q_{ij} = \frac{\left(1 + \frac{\|z_i - \mu_j\|^2}{\alpha}\right)^{-\frac{\alpha+1}{2}}}{\sum_j \left(1 + \frac{\|z_i - \mu_j\|^2}{\alpha}\right)^{-\frac{\alpha+1}{2}}}$$

among them, $q_{ij} \in [0,1]$, represents the probability of assigning the i-th low-dimensional embedded point $z_i$ to the j-th cluster $\mu_j$, j=1, 2, ..., k, where k=3; $\alpha$ is an adjustable constant;

step 2.2: calculate the real assignment distribution of each low-dimensional embedded point $z_i$;

suppose there is a real assignment distribution $p_{ij}$ for the actual clustering task in the data $z_i$; the method compute $p_{ij}$ by first raising $q_{ij}$ to the second power and then normalizing by frequency per cluster;

$$p_{ij} = \frac{q_{ij}^2 / f_j}{\sum_j q_{ij}^2 / f_j}$$

among them, $p_{ij}$ represents the real assignment distribution of the low-dimensional embedded point $z_i$ to the j-th cluster; $f_j = \sum_i q_{ij}$ represents the sum of the total soft assignment distribution probability of the low-dimensional embedded points classified into the j-th cluster;

step 2.3: construct the loss function using KL divergence;

the loss function L in this application uses KL divergence in information theory to measure the similarity of two distributions;

$$L = KL(P \| Q) = \sum_i \sum_j p_{ij} \log \frac{p_{ij}}{q_{ij}}$$

among them, $L \geq 0$, if and only if the P and Q distributions are exactly the same, L=0; P represents the real assignment distribution and Q represents the soft assignment distribution.

4. The method according to claim 3, wherein:

in step 3, the objective of the gradient descent algorithm to optimize the loss function is as follows:

$$\min L = KL(P \| Q) = \sum_i \sum_j p_{ij} \log \frac{p_{ij}}{q_{ij}}$$

$$\theta = \operatorname{argmin} L = KL(P \| Q) = \sum_i \sum_j p_{ij} \log \frac{p_{ij}}{q_{ij}}$$

the network parameters of the stacked autoencoder model are represented as $\theta$.

5. The method according to claim 1, wherein, the step 2 comprises:

step 2.1: calculate the soft assignment distribution of each low-dimensional embedded point $z_i$ and the centroid $\mu_j$ of each cluster;

the application utilizes the t-distribution as a kernel to measure the similarity between the low-dimensional embedded point $z_i$ and the centroid point $\mu_j$; the soft assignment distribution $q_{ij}$ is defined as follows:

$$q_{ij} = \frac{\left(1 + \frac{\|z_i - \mu_j\|^2}{\alpha}\right)^{-\frac{\alpha+1}{2}}}{\sum_j \left(1 + \frac{\|z_i - \mu_j\|^2}{\alpha}\right)^{-\frac{\alpha+1}{2}}}$$

among them, $q_{ij} \in [0,1]$, represents the probability of assigning the i-th low-dimensional embedded point $z_i$ to the j-th cluster $\mu_j$, j=1, 2, ..., k, where k=3; $\alpha$ is an adjustable constant;

step 2.2: calculate the real assignment distribution of each low-dimensional embedded point $z_i$;

suppose there is a real assignment distribution $p_{ij}$ for the actual clustering task in the data $z_i$; the method compute $p_{ij}$ by first raising $q_{ij}$ to the second power and then normalizing by frequency per cluster;

$$p_{ij} = \frac{q_{ij}^2 / f_j}{\sum_j q_{ij}^2 / f_j}$$

among them, $p_{ij}$ represents the real assignment distribution of the low-dimensional embedded point $z_i$ to the j-th cluster; $f_j = \sum_i q_{ij}$ represents the sum of the total soft assignment distribution probability of the low-dimensional embedded points classified into the j-th cluster;

step 2.3: construct the loss function using KL divergence;

the loss function L in this application uses KL divergence in information theory to measure the similarity of two distributions;

$$L = KL(P \| Q) = \sum_i \sum_j p_{ij} \log \frac{p_{ij}}{q_{ij}}$$

among them, $L \geq 0$, if and only if the P and Q distributions are exactly the same, L=0; P represents the real assignment distribution and Q represents the soft assignment distribution.

6. The method according to claim 5, wherein:

in step 3, the objective of the gradient descent algorithm to optimize the loss function is as follows:

$$\min L = KL(P \| Q) = \sum_i \sum_j p_{ij} \log \frac{p_{ij}}{q_{ij}}$$

$$\theta = \operatorname{argmin} L = KL(P \| Q) = \sum_i \sum_j p_{ij} \log \frac{p_{ij}}{q_{ij}}$$

the network parameters of the stacked autoencoder model are represented as $\theta$.

7. The method according to claim 1, wherein:

in step 3, during training, a momentum-based Stochastic Gradient Descent (SGD) is used to jointly optimize network's parameters $\theta$;

the gradients of L with low-dimensional embedded point $z_i$ and each cluster centroid $\mu_j$ are computed as follows:

$$\frac{dL}{dz_i} = \frac{\alpha+1}{\alpha} \sum_j \left(1 + \frac{\|z_i - \mu_j\|^2}{\alpha}\right)^{-1} \times (p_{ij} - q_{ij})(z_i - \mu_j)$$

-continued $$\frac{dL}{d\mu_j} = -\frac{\alpha+1}{\alpha}\sum_i \left(1+\frac{\|z_i-\mu_j\|^2}{\alpha}\right)^{-1} \times (p_{ij}-q_{ij})(z_i-\mu_j)$$

among them, $\alpha$ is a constant, $q_{ij}$ is the soft assignment distribution of $z_i$ and centroid $\mu_j$, and $p_{ij}$ is the real assignment distribution of $z_i$ and centroid $\mu_j$;

the gradients $$\frac{dL}{dz_i} \text{ and } \frac{dL}{d\mu_j}$$

are then passed down to the encoder network of the stacked autoencoder network and used to compute the network's parameter $\theta$;

the training is completed when the total number of loop iterations set in advance is reached.

* * * * *